(12) United States Patent
Brown et al.

(10) Patent No.: US 7,245,716 B2
(45) Date of Patent: Jul. 17, 2007

(54) CONTROLLING HOLD QUEUE POSITION ADJUSTMENT

(75) Inventors: Michael Wayne Brown, Georgetown, TX (US); Joseph Herbert McIntyre, Austin, TX (US); Michael A. Paolini, Austin, TX (US); James Mark Weaver, Austin, TX (US); Scott Lee Winters, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 904 days.

(21) Appl. No.: 10/015,382

(22) Filed: Dec. 12, 2001

(65) Prior Publication Data

US 2003/0108185 A1    Jun. 12, 2003

(51) Int. Cl.
*H04M 5/00* (2006.01)
*H04M 3/00* (2006.01)
*H04M 11/00* (2006.01)

(52) U.S. Cl. .............. 379/266.01; 379/309; 379/93.02; 379/93.03

(58) Field of Classification Search ........... 379/265.01, 379/266.01, 309, 93.02, 93.03
See application file for complete search history.

(56) References Cited

U.S. PATENT DOCUMENTS

| | | | |
|---|---|---|---|
| 5,014,298 A | 5/1991 | Katz | 379/93 |
| 5,164,983 A | 11/1992 | Brown et al. | 379/265.03 |
| 5,303,042 A | 4/1994 | Lewis et al. | 348/14 |
| 5,499,288 A | 3/1996 | Hunt et al. | 379/88 |
| 5,561,707 A | 10/1996 | Katz | 379/88 |
| 5,590,188 A | 12/1996 | Crockett | 379/225 |
| 5,646,988 A | 7/1997 | Hikawa | 379/266.01 |
| 5,673,404 A | 9/1997 | Cousins et al. | 395/347 |
| 5,790,637 A | 8/1998 | Johnson et al. | 379/67 |
| 5,806,045 A * | 9/1998 | Biorge et al. | 705/14 |
| 5,828,735 A | 10/1998 | Farfan | 379/93.13 |
| 5,864,872 A | 1/1999 | Lee et al. | 711/115 |
| 5,915,001 A | 6/1999 | Uppaluru | 379/88.22 |
| 5,933,828 A | 8/1999 | Eitel et al. | 707/10 |
| 5,937,044 A | 8/1999 | Kim | |

(Continued)

FOREIGN PATENT DOCUMENTS

EP    0585004 A2    3/1994

(Continued)

OTHER PUBLICATIONS

WPAT Derwent 1994-067503.

(Continued)

*Primary Examiner*—Rasha S. AL-Aubaidi
(74) *Attorney, Agent, or Firm*—Mark S. Walker; Amy J. Pattillo

(57) ABSTRACT

A method, system, and program for allowing callers to adjust in position within a hold queue are provided. An advancement token earned by a caller while waiting in a hold queue is detected. The advancement token is stored for redemption in a future call by the caller according to an authenticated identifier for the caller, wherein future redemption of the advancement token will cause adjustment of a waiting position. In particular, a caller in the call hold queue may earn advancement tokens by answering questions posed by other callers in the call hold queue, where the questions are answered in a manner such that the other callers do not need additional aid from a representative. In addition, a caller may redeem advancement tokens earned in a previous hold queue while waiting in current hold queue, where the redeemable advancement tokens are accessible across multiple call centers according to the caller identification.

24 Claims, 8 Drawing Sheets

U.S. PATENT DOCUMENTS

| | | | |
|---|---|---|---|
| 5,940,476 A | 8/1999 | Morganstein et al. | 379/88.02 |
| 5,946,386 A | 8/1999 | Rogers et al. | |
| 5,946,388 A * | 8/1999 | Walker et al. | 379/266.01 |
| 5,946,654 A | 8/1999 | Newman et al. | 704/246 |
| 5,978,467 A | 11/1999 | Walker et al. | 379/266.01 |
| 6,038,305 A | 3/2000 | McAllister et al. | 379/207 |
| 6,058,364 A | 5/2000 | Goldberg et al. | 704/252 |
| 6,064,730 A | 5/2000 | Ginsberg | 379/265.09 |
| 6,088,435 A | 7/2000 | Barber et al. | 379/205.01 |
| 6,088,444 A | 7/2000 | Walker et al. | 379/266 |
| 6,101,242 A | 8/2000 | McAllister et al. | 379/88.02 |
| 6,122,357 A | 9/2000 | Farris et al. | 379/207 |
| 6,125,178 A | 9/2000 | Walker et al. | 379/266 |
| 6,151,387 A | 11/2000 | Katz | 379/93.13 |
| 6,157,655 A | 12/2000 | Shtivelman | 370/412 |
| 6,178,230 B1 | 1/2001 | Borland | 379/67.1 |
| 6,178,240 B1 | 1/2001 | Walker et al. | 379/266.01 |
| 6,208,729 B1 | 3/2001 | Agraharam et al. | 379/266 |
| 6,222,920 B1 | 4/2001 | Walker et al. | 379/266 |
| 6,263,051 B1 | 7/2001 | Saylor et al. | 379/88.17 |
| 6,324,276 B1 | 11/2001 | Uppaluru et al. | 379/220.01 |
| 6,327,346 B1 | 12/2001 | Infosino | 379/88.02 |
| 6,381,329 B1 | 4/2002 | Uppaluru et al. | |
| 6,424,709 B1 | 7/2002 | Doyle et al. | 379/265.02 |
| 6,487,291 B1 | 11/2002 | Walker et al. | 379/266.02 |
| 6,502,745 B1 * | 1/2003 | Stimson et al. | 235/375 |
| 6,519,570 B1 | 2/2003 | Faber et al. | 705/8 |
| 6,522,743 B1 | 2/2003 | Hurd | |
| 6,535,492 B2 | 3/2003 | Shtivelman | 370/270 |
| 6,826,173 B1 | 11/2004 | Kung et al. | |
| 6,826,276 B2 | 11/2004 | Brown et al. | |
| 6,842,767 B1 | 1/2005 | Partovi et al. | |
| 6,845,155 B2 | 1/2005 | Elsey | |
| 2002/0131399 A1 | 9/2002 | Philonenko | 370/351 |
| 2002/0141561 A1 | 10/2002 | Duncan et al. | 379/220.01 |
| 2002/0196927 A1 | 12/2002 | Johnson et al. | 379/265.02 |
| 2003/0103619 A1 * | 6/2003 | Brown et al. | 379/266.01 |
| 2003/0108162 A1 | 6/2003 | Brown et al. | 379/88.1 |
| 2003/0108184 A1 | 6/2003 | Brown et al. | 379/265.09 |
| 2003/0108186 A1 | 6/2003 | Brown et al. | 379/266.01 |
| 2003/0108187 A1 | 6/2003 | Brown et al. | 379/266.06 |
| 2004/0029567 A1 | 2/2004 | Timmins et al. | 455/412.1 |

FOREIGN PATENT DOCUMENTS

| | | |
|---|---|---|
| EP | 0676882 A2 | 10/1995 |
| JP | 8139797 A | 5/1996 |
| JP | 10294784 A | 11/1998 |
| WO | WO 98/35507 | 8/1998 |

OTHER PUBLICATIONS

WPAT Derwent 1995-346415.
WPAT Derwent 1996-315499.
WPAT Derwent 1999-031530.

* cited by examiner

```
                    CALLER PROFILE                            ─── 75

VID - JANE SMITH 500-00-000

MUSIC PREFERENCE : CLASSICAL, LIGHT ROCK
NEWS PREFERENCE : HEADLINE NEWS
GAME PREFERENCE : GROUP, TRIVIA
AGE : 30
CURRENT WAIT HISTORY
        20 MINS QUEUE 1      -> TRANSFER TO QUEUE 3 - QUEUE 1 WRONG
            10 MINS COMPETITION 1
            10 MINS COMPETITION 2
        2 MINS QUEUE 3      CURRENTLY ON HOLD
            2 MINS SURVEY
MONTHLY TIME WITH REPRESENTATIVE
        AVERAGE TIME : 10 MINUTES
        LONGEST TIME: 30 MINUTES
        SHORTEST TIME: 2 MINUTES
ON HOLD POINTS = 20
MEMBERSHIP POINTS
        COMPANY A - 500
        COMPANY B - 400
        COMPANY C - 600
ADVANCEMENT TOKENS
        CALL CENTER A - 10 MINS (AUTHORIZED BY TA SYSTEM 2040)
        CALL CENTER B - 2 PLACES (AUTHORIZED BY TA SYSTEM 1050)
        CALL CENTER C - 4 MINS (AUTHORIZED BY TA SYSTEM 2050)
```

FIG. 4

CONTROLLING HOLD QUEUE POSITION ADJUSTMENT

CROSS-REFERENCE TO RELATED APPLICATIONS

The present application is related to the following co-pending applications:
(1) U.S. patent application Ser. No. 10/015,380;
(2) U.S. patent application Ser. No. 10/015,266;
(3) U.S. patent application Ser. No. 10/015,264;
(4) U.S. patent application Ser. No. 10/015,383; and
(5) U.S. patent application Ser. No. 10/004,664;

BACKGROUND OF THE INVENTION

1. Technical Field

The present invention relates in general to telecommunications and, in particular, to managing a caller's position in a hold queue. Still more particularly, the present invention relates to enabling callers to control hold queue position adjustment.

2. Description of the Related Art

Many companies provide telephone-based access to help staff, sales personnel, representatives, and automated menus. Where high telephone call traffic is typical in telephone access to a company's representatives, automatic call distribution systems (ACDs) are often employed within call center operations to provide an even and systematic distribution of incoming calls to multiple representatives. ACDs typically provide incoming calls with a direct connection to an available representative until all representatives are busy. Then, once all representatives are waiting on customers, calling parties are placed in a hold queue, and selectively connected to a representative once a representative comes available.

In general, when a caller is placed in a hold queue, the caller's queue position is dependent upon the receipt time of the call at the vendor location. Some companies utilize call center systems that sort callers into multiple queues according to selection criteria that a caller enters. For example, a user may select from a menu of five possible types of information the caller would like to receive, such that the caller is placed in one of five hold queues. However, ultimately, the caller's queue position within one of the five hold queues is dependent upon the time at which the caller makes a menu selection.

According to one example, a call processing apparatus may designate the position of a call within the queue in accordance with the potential economic value of the call. However, the call processing apparatus is limited in that each caller's position within the hold queue is adjusted in a manner that is hidden from the caller, allowing only the company to maintain control in the position of a caller within a hold queue.

According to another example, a caller may be enabled to change the caller's position within a hold queue by making a payment to the hold queue service. A caller may enter a credit card number or account number from which a charge for advancing in the hold queue is charged. While the call processing apparatus grants a caller control over the caller's position within a hold queue, the call processing apparatus is limited in that the control is given in exchange for the company receiving a direct economic benefit from adjusting the position of the caller within a hold queue.

Many companies utilize the time that a caller is waiting in hold call queue to broadcast over the telephone line. For example, a company may subscribe to or implement an ACD that plays music or advertising while callers wait in the hold queue. In addition, the ACD may verbally alert the caller to the amount of time estimated before a representative will be available, the position of the caller in the hold queue, and other information that will assure the caller of a changing position in the hold queue.

While call queuing provides advantages over a consumer retrying a call in response to a busy signal, ultimately call queuing may cause frustration and ill will of consumers towards a company, particularly where excessively long waits, full queues and accidental disconnects are encountered. Allowing consumers to feel some control over a position within the call queue without requiring the consumer to pay for the control would be advantageous in alleviating such frustrations.

In view of the foregoing, it would be advantageous to provide a hold queue system that allows a caller to control the caller's position within a hold queue independent of the receipt time of the call. In particular, it would be advantageous to allow a caller to earn position advancements and to hold those position advancements over to future calls.

SUMMARY OF THE INVENTION

In view of the foregoing, it is therefore an object of the present invention to provide an improved telecommunications system.

It is another object of the present invention to provide a method, system and program for managing a caller's position in a hold queue.

It is yet another object of the present invention to provide a method, system and program for enabling callers to control hold queue position adjustment.

According to one aspect of the present invention, an advancement token earned by a caller waiting in a hold queue is detected. The advancement token is stored for redemption in a future call by the caller according to an authenticated identifier for the caller, wherein future redemption of the advancement token will cause adjustment of a waiting position.

According to another aspect of the present invention, a call is received from a caller at a hold queue, wherein an identity of the caller is authenticated. A caller profile is accessed according to the identity of the caller, wherein the caller profile comprises at least one previously earned advancement token. The caller is offered an option of redeeming the previously earned advancement token for adjustment of a position of the caller in said hold queue.

According to a further aspect of the present invention, a caller may earn an advancement token by answering questions for other callers waiting with the caller in a hold queue, where those callers are sufficiently helped so as to not need the aid of a representative.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 illustrates an illustrative representation of a caller profile according to a caller VID in accordance with the method, system, and program of the present invention;

DETAILED DESCRIPTION OF THE PREFERRED EMBODIMENT

Figure 1:
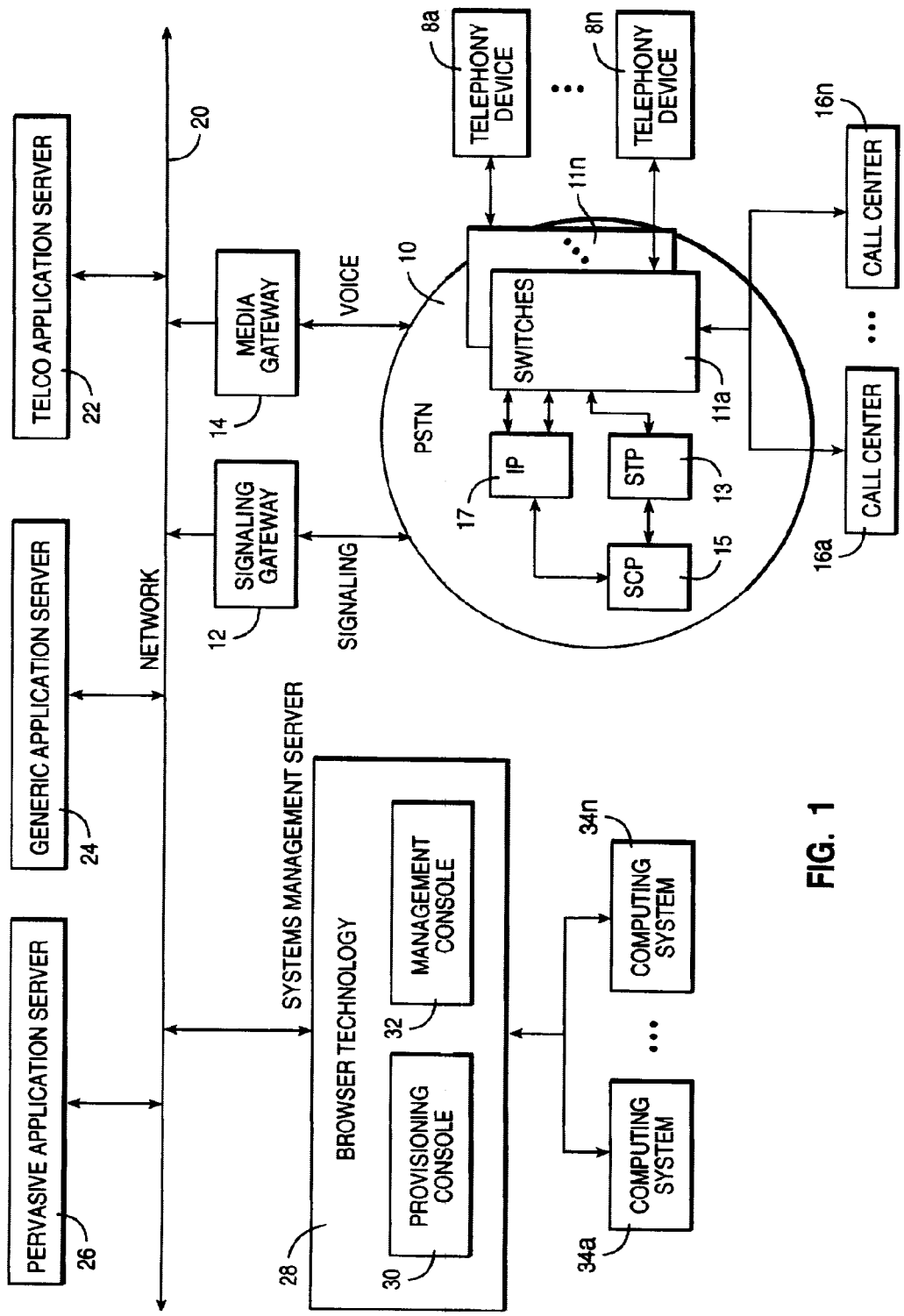
FIG. 1 depicts a block diagram of a telecommunications network in which the present invention may be implemented.

A method, system, and program for enabling callers to control over adjusting positions within a call hold queue are provided. In general, a caller is given an opportunity while on hold to participate in actions that may gain the caller an adjustment in position within the call queue in addition to the adjustment in position that is automatically provided as calls are answered from the call hold queue. A caller's position within the call hold queue may be advanced by a single or multiple positions.

In particular, a caller may gain advancement tokens, that when redeemed, adjust a caller's position within a hold queue. A caller may select whether to redeem an advancement token earned during that hold, or whether to save the advancement token for a future hold session. In addition, a caller may select to use a portion of an advancement token for one hold session and store the remainder of the advancement token for application in a future hold session.

According to one advantage of the present invention, a caller may earn redeemable advancement tokens while on hold. In particular, a caller may earn redeemable advancement tokens by participating in a competition or survey while on hold. In addition, a caller may earn redeemable advancement tokens by answering questions for other callers waiting in the hold queue.

According to another advantage of the present invention, a caller may earn redeemable advancement tokens independent of an on hold status. In particular, a caller may earn points or other credits through purchases, participation in surveys, and other actions for which a vendor is willing to advance points. The points or other credits are preferably stored in a caller profile according to the authenticated identifier for the caller may access while on hold and redeem the points or other credits for advancement tokens.

According to a further advantage of the present invention, a caller may be granted redeemable advancement tokens by meeting other criteria specified by a call center. For example, if a caller utilized an average time with representatives that is substantially less than the average time per representative of the call center, the call center may provide the caller with redeemable advancement tokens to be utilized for a future call. In another example, a call center may provide advancement tokens or automatically advance a caller with an account of a particular value to the call center. Moreover, callers utilizing certain types of devices, such as a wireless telephony device, may be granted advancement tokens.

For purposes of the present invention, telephony devices are termed origin devices when utilized for origination of a call to an intermediary device and are termed destination devices when utilized for receipt of a call from an intermediary device. Subscribers to a call are termed callers when originating a call and are termed callees when receiving a call. Callers and callees may or may not be line subscribers to the particular telephony device utilized.

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

The present invention may be executed in a variety of systems, including a variety of computing systems and electronic devices under a number of different operating systems. In one embodiment of the present invention, the call queue management system (e.g. an ACD) is a computer system that incorporates communication features that provide telephony, messaging, and information services to a plurality of callers. In general, the present invention is preferably executed in a computer system that performs computing tasks such as manipulating data in storage that is accessible to the computer system.

With reference now to the figures, and, in particular, with reference now to FIG. 1, there is depicted a block diagram of a network environment in which the present invention may be implemented. While the present invention is described with reference to one type of network environment, it will be understood by one with skill in the art that the present invention may be implemented in alternate types of network environments.

General Network Environment

First, the network environment incorporates a Public Switching Telephone Network (PSTN) 10. As is known in the art the core of PSTN 10 may include multiple telephone networks, each owned by one of multiple independent service providers. Each telephone line is carried by an independent service provider within PSTN 10 and is typically assigned to at least one subscriber.

Switching of a call within an independent service provider's telephone network is considered trusted movement within a trusted network because the call remains within the company's telephone network infrastructure. However, calls may be transferred from one service provider's telephone network to another service provider's telephone network in generally trusted movement. Generally, service providers are in competition with one another and therefore there is general trust in transferring a call, but not trust in sharing of subscriber information from one service provider to the next without security features.

Advantageously, each telephone network within PSTN 10 may access a data network functioning as an extension to PSTN 10 via an Intranet. Data networks may include, for example, subscriber profiles, billing information, and preferences that are utilized by a service provider to specialize services. Transfer of information between a service provider's data network and telephone network is trusted movement in sharing of information.

Further, each telephone network within PSTN 10 may access server systems external to PSTN 10 in the Internet Protocol over the Internet or an Intranet. Such external server systems may include an enterprise server, an Internet service provider (ISP), an access service provider (ASP), a personal computer, and other computing systems that are accessible via a network. In the present embodiment, transfer of information between PSTN 10 and server systems accessible via network 20 is totally untrusted and therefore may require authentication and additional security.

In the present invention, network 20 may comprise a private network, Intranet, or a public Internet Protocol network. Specifically, telco application server 22, generic application server 24, pervasive application server 26, and systems management server 28 represent server systems external to PSTN 10 that may be accessed by PSTN 10 over network 20.

In particular, telco application server 22 preferably includes multiple telco specific service applications for providing services to calls transferred to a server external to PSTN 10. In particular, a call may be transferred from PSTN 10 to telco application server 22 to receive at least one service and then the call is transferred back to PSTN 10. Such services may also be provided to calls within PSTN 10, however placing such services at a third party such as telco application server 22, is advantageous because adding services and information to PSTN 10 is time consuming and costly when compared with the time and cost of adding the services through telco application server 22.

In accord with an advantage of the present invention, as will be further described, the identity of both the caller and the callee may be authenticated by one of telephony devices 8a -8n, PSTN 10, or by telco application server 22. By authenticating the actual identity of the person making a phone call and the person receiving the phone call, rather than the identification of a device from which a call is made and received, an enhanced specialization of services to subscribers may be performed.

An authentication service within telco application server 22 may include identification and verification of the identity of a caller and/or callee of a particular call. Such a service may require that subscribers provide voice samples when setting up a subscription. The stored voice samples may then be compared against voice samples received for a particular call in order to authenticate the identity of a current caller or callee of the particular call.

Generic application server 24 preferably accesses independent server systems that provide services. For example, a messaging server, a financial server, an Internal Revenue Service (IRS) server, and database management system (DBMS) server may be accessed in HTTP via network 20. Each of these servers may include a telco service application that requires authentication of the subscriber before access is granted. For example, a financial server may provide a telco service application that allows an authenticated subscriber to access current financial records and request stock quotes from the financial server.

Pervasive application server 26 manages services for wirelessly networked devices. In particular, pervasive application server 26 preferably handles distribution of wireless packets of voice and data to wirelessly networked devices utilizing a standard such as short messaging service (SMS) messaging or other 3G standards.

Systems management server 28 manages subscriber personalization via the web. In particular, systems management server 28 includes browser technology that includes a provisioning console 30 for establishing a subscriber profile and a management console 32 for managing and updating the subscriber profile. A subscriber preferably accesses the consoles of systems management server 28 via the Internet utilizing a computing system, such as computing systems 34a-34n.

The subscriber profile may be accessed at systems management server 28 by other external servers and PSTN 10 via network 20. In addition, a local copy of a subscriber profile updated in systems management server 28 may be stored within a particular service provider's data network or telephone network. Each service provider may specify the types of preferences and other information included within a subscriber profile.

In particular, a subscriber may provide a voice imprint when establishing a subscriber profile through provisioning console 30. Other types of authentication information may also be provided including, but not limited to, a password, an eye scan, a smart card ID, and other biometric methods. In addition, a subscriber may designate billing preferences, shopping preferences, buddy list preferences, and other preferences that enable specialized service to the subscriber when the subscriber's identity is authenticated from the voice imprint or other identification.

Advantageously, a management agent is built into each external server to monitor the services provided by each server according to the authenticated subscriber receiving the services. By monitoring service output according to subscriber, the subscriber may then be billed according to each use of a service.

PSTN 10 preferably includes both voice and data signaling networks that interface with network 20 via gateways. Each of the gateways acts as a switch between PSTN 10 and network 20 that may compress a signal, convert the signal into Internet Protocol (other protocol) packets, and route the packets through network 20 to the appropriate server.

In particular, the voice network interfaces with network 20 through media gateway 14 which supports multiple protocol gateways including, but not limited to, SIP. SIP is a signaling protocol for Internet conferencing, telephony, presence, events notification and instant messaging.

In addition, in particular, the data signaling network interfaces with network 20 through signaling gateway 12 which supports multiple protocol gateways including, but not limited to, parlay protocol gateways and SS7 protocol gateways. Internet servers, such as telco application server 22 may include protocol agents that are enabled to interact with multiple protocols encapsulated in Internet Protocol packets including, but not limited to, SS7 protocol, parlay protocol, and SIP.

PSTN Identity Authentication and Call Control

Looking into PSTN 10, a telephone network typically includes multiple switches, such as central office switches 11a-11n, that originate, terminate, or tandem calls. Central office switches 11a-11n utilize voice trunks for transferring voice communications and signaling links for transferring signals between signaling points.

Between signaling points, one central office switch sends signaling messages to other central office switches via signaling links to setup, manage, and release voice circuits required to complete a call. In addition, between signaling points, central office switches 11a-11n query service control points (SCPs) 15 to determine how to route a call. SCPs 15 send a response to the originating central office switch containing the routing number(s) associated with the dialed number.

SCPs 15 may be general purpose computers storing databases of call processing information. While in the present embodiment SCPs 15 are depicted locally within PSTN 10, in alternate embodiments SCPs 15 may be part of an extended network accessible to PSTN 10 via a network.

One of the functions performed by SCPs 15 is processing calls to and from various subscribers. For example, an SCP may store a record of the services purchased by a subscriber, such as a privacy service. When a call is made to the subscriber, the SCP initiates an announcement to a caller to identify themself to the subscriber with the privacy service who is being called. According to an advantage of the invention, authentication of the subscriber receiving the call may be required before the privacy service is initiated for that subscriber.

In particular, network traffic between signaling points may be routed via a packet switch called an service transfer point (STP) 13. STP 13 routes each incoming message to an outgoing signaling link based on routing information. Further, in particular, the signaling network may utilize an SS7 network implementing SS7 protocol.

Central office switches 11a-11n may also send voice and signaling messages to intelligent peripherals (IP) 17 via voice trunks and signaling channels. IP 17 provides enhanced announcements, enhanced digit collection, and enhanced speech recognition capabilities.

According to an advantage of the present invention, the identity of a caller is authenticated according to voice authentication. Voice authentication is preferably performed by first identifying a subscriber by matching the name or other identifier spoken with a subscriber name or identifier. Next, voice authentication requires verifying that the voice audio signal matches that of the identified subscriber. However, in alternate embodiments, the identity of a subscriber may be authenticated according to passwords, eye scans, encryption, and other biometric methods.

In particular, to perform subscriber authentication of audio signals received from callers, IP 17 may include storage for subscriber specific templates or voice feature information, for use in authenticating subscribers based on speech. If a subscriber specific template is not stored on a local IP 17, then a remote IP containing the subscriber specific template may be accessed via a network. In addition, local IP 17 may access systems management server 28 or another repository for voice imprints to access the subscriber specific template.

Where IP 17 authenticates the identity of a caller (e.g. the subscriber placing a call), a voice identifier (VID) representing the authenticated caller identity is transferred as a signal for identifying the caller. In addition, where IP 17 authenticates the identity of a callee (e.g. the subscriber receiving a call), a reverse VID (RVID) including the callee identity is transferred as a signal for identifying the callee.

Advantageously, VIDs indicate through text, voice, or video the identity of a caller. For example, a caller's name may be transferred as the identity of a caller. Alternatively, a video clip stored with the subscriber template may be transferred as the identity of a caller. Additionally, VIDs may indicate the identity of the device utilized by a caller to provide context for a call. Further, VIDs may indicate which system or systems have authenticated the caller identity.

After a VID and/or RVID are determined by IP 17, IP 17 and SCP 15 may communicate to designate which services are available according to VID and RVID. Advantageously, by designating services according to a VID and/or RVID, subscribers are provided with services and billed for those services independent of the devices utilized by subscribers. In particular, a 1129 protocol or other protocol may be utilized to enable signal communications between IP 17 and SCPs 15. In addition, as previously described, caller authentication to determine VIDs and RVIDs may be performed by a third party, such as telco application server 22.

An origin telephony device or destination telephony device may also determine a VID and/or RVID for the caller and/or callee of a call. In particular, telephony devices 8a-8n and call centers 16a-16n may function as origin and designation telephony devices. Each of the telephony devices may include a database of voice templates that may be matched to authenticate the identity of a caller or callee. In addition, each of the telephony devices may access a third party, such as telco application server 22, to authenticate the identity of the caller or callee.

In either case, the telephony device transmits a VID and/or RVID with a call to PSTN 10.

Telephony devices 8a-8n may include, but are not limited to wireline devices, wireless devices, pervasive device equipped with telephony features, a network computer, a facsimile, a modem, and other devices enabled for network communication. Advantageously, as previously described, a voice authentication functioning device may be included in each of telephony devices 8a-8n.

In addition, telephony devices 8a-8n may each incorporate a display that provides a visual output of a VID or RVID. Alternatively, such a display may be provided in a separate device connected to the line in parallel to telephones 8a-8n. According to one advantage of the present invention, the identity of the actual caller or actual callee are output to a display in association with a call. In addition, other context information about the caller including, but not limited to, the device from which the call originates or is answered, ratings for a caller or callee, and other context information may be output to a display in association with a call.

Telephony devices 8a-8n are communicatively connected to PSTN 10 via wireline, wireless, ISDN, and other communication links. Preferably, connections to telephony devices 8a-8n provide digital transport for two-way voice grade type telephone communications and a channel transporting signaling data messages in both directions between telephony devices 8a-8n and PSTN 10.

In addition to telephony devices 8a-8n, advanced telephone systems, such as call centers 16a-16n, may be communicatively connected to PSTN 10 via wireline, wireless, ISDN and other communication links. Call centers 16a-16n may include PBX systems, hold queue systems, private network systems, and other systems that are implemented to handle distribution of calls to multiple representatives or agents.

Returning to central office switches 11a-11n, typically, one central office switch exists for each exchange or area served by the NXX digits of an NXX-XXXX (seven digit) telephone number or the three digits following the area code digits (NPA) in a ten-digit telephone number. The service provider owning a central office switch also assigns a telephone number to each line connected to each of central office switches 11a-11n. The assigned telephone number includes the area code (NPA) and exchange code (NXX) for the serving central office and four unique digits (XXXX).

Central office switches 11a-11n utilize office equipment (OE) numbers to identify specific equipment, such as physical links or circuit connections. For example, a subscriber's line might terminate on a pair of terminals on the main distribution frame of one of central office switches 11a-11n. The switch identifies the terminals, and therefore a particular line, by an OE number assigned to that terminal pair. For a variety of reasons, a service provider may assign different telephone numbers to the one line at the same or different times. For example, a local carrier may change the telephone number because a subscriber sells a house and a new subscriber moves in and receives a new number. However, the OE number for the terminals and thus the line itself remains the same.

On a normal call, a central office switch will detect an off-hook condition on a line and provide a dial tone. The switch identifies the line by the OE number. The central office switch retrieves profile information corresponding to the OE number and off-hook line. Then, the central office switch receives the dialed digits from the off-hook line terminal and routes the call. The central office switch may route the call over trunks and possibly through one or more central office switches to the central office switch that serves the called party's station or line. The switch terminating a call to a destination will also utilize profile information relating to the destination, for example to forward the call if appropriate, to apply distinctive ringing, etc.

In the present invention, when a central office switch detects an off-hook condition on a line, the central office switch will then determine if a VID signal is transferred from the off-hook telephony device. If a VID is transferred, then a query is made to SCP 15 according to the VID for any services specified for the authenticated subscriber. Alternatively, a query may be transferred via network 20 to an external server, such as system management server 28, to determine the services specified for the caller. The central office switch will then receive the dialed digits from the off-hook line terminal and route the call, providing services according to those preferred by the authenticated subscriber.

Alternatively, if a VID signal is not transferred from the off-hook telephony device, then the central office switch will provide a dial tone and transfer the call to an IP that prompts the caller to provide a voice entry or other identification. Alternatively, the central office switch may transfer the call to telco application server 22 for use of the caller authentication service. In either case, the identity for the subscriber is preferably authenticated, the call is transferred back to the central office switch, services are provided according to the VID authenticated for the subscriber, and the call is routed according to dialed digits from the off-hook line terminal.

In addition, an RVID may be provided in the present invention to authenticate the identity of a callee receiving the call. When a call is answered, the call is transferred back to an IP or telco application server 22 to authenticate the identity of the callee answering the call.

As another alternative to dialed digits from the off-hook line terminal, a caller may utilize a voice calling function of a telephony device for indicating how the call should be routed. For example, a caller may say the name of a preferred callee. The device or IP 17 may determine a person within the caller's calling list that matches the voiced name. The matching person's digits are then utilized to route the call.

Call Center Environment

Figure 2:
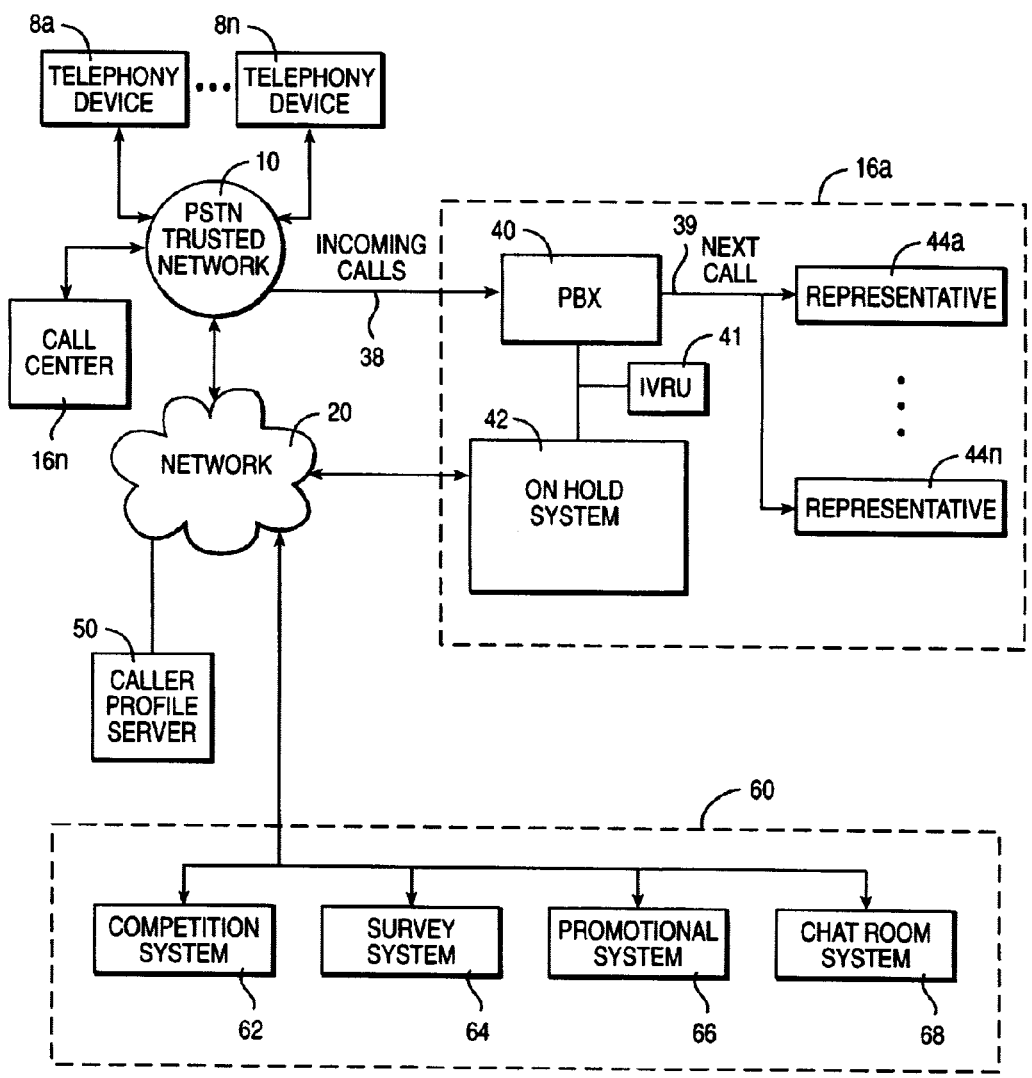
FIG. 2 illustrates a block diagram of a network call center system in which the present invention may be implemented.

Referring now to FIG. 2, is an illustrative network call or contact center environment in which the present invention may be implemented. It will be appreciated by one with skill in the art that although a particular network environment is described below, the invention is not limited to use within the described network environment, rather, the inventive queue position advancement process may be implemented within any on-hold information service regardless of the telephony environment.

As illustrated, multiple incoming calls are received at a call center 16. In particular, a connection 38 includes a voice trunk and a signal link, such that both voice and VID signals may be received at PXB 40 from PSTN 10. Connection 38 is preferably connected to PSTN 10 via a wireline, wireless, Internet Protocol network, or other connection. PBX 40 distributes incoming calls to multiple representative terminals 44a-44n via connection 39, wherein connection 39 also includes a voice trunk and a signal link. In particular, PBX systems, and in particular PBX systems with automatic call distribution (ACD) ability, are well known in the art as switching systems designed to received telephone calls destined for call center 16 and to queue those call when a call handling agent is not available.

In the description which follows, it will be assumed that all representative terminals 44a-44n are busy and therefore PBX 40 cannot respond to an incoming call by making a direct connection to one of representative terminals 44a-44n. As a result, PBX 40 is forced to place the incoming call on hold. However, an advantage of the present invention is that when a call is transferred to one of representative terminals 44a-44n, the VID for the call is also transferred, enabling a representative to receive an authenticated identity of a caller. Additional authentication may be required by PBX 40 where callers are accessing sensitive information from representatives.

After placing the incoming call on hold, the VID, time of call, and other information received by PBX 40 are forwarded to on hold system 42. On hold system 42 preferably creates a record based on the call and positions the call within one of the call hold queues within on hold system 42. In particular, the call queue selected for a call may be specified by a caller indication of the subject matter of a call. In addition, a single call queue may be utilized to store all calls on hold.

A request for a caller profile is preferably transmitted from on hold system 42 for each VID received. In particular, caller profiles may be held within a local caller profile database, however are also advantageously accessible from a caller profile server 50 according to VID, where caller profile server 50 may communicate with multiple call centers to retrieve and update caller profiles according to VID.

As illustrated, on hold system 42 accesses caller profile server 50 via network 20. Advantageously, by storing caller profiles in caller profile server 50 according to VID, only a single identifier is needed to access a caller profile and only a single location is provided for access to a caller profile. Further, advantageously, a caller is only required to enter preferences and other information in one place, for storage according to VID, where the information is then accessible to multiple diverse call centers and other systems. As an additional advantage, different portions of a caller profile may be stored in different server system locations, but each referenced for a single caller according to that caller's VID.

For purposes of the present invention, a caller profile may include advancement tokens that are stored according to VID for use by a caller during future holds. Advancement tokens included in the caller profile may be separated according to vendor or type of advancement token. Advantageously, multiple vendors may support a single type of advancement token, such that a caller may earn an advancement token while on hold at one call center, but wait to redeem the advancement token while on hold at another call center.

While the call is on hold, an interactive voice response unit (IVRU) 41, coupled to PBX 40 and on hold system 42, may offer the caller a menu of available options for receiving call hold queue information for on hold system 42. In general, IVRU 41 is a voice information system which may be arranged to (i) prompt a caller for specific information by asking questions based on a set of modules in a transactions script, (ii) collect that information by detecting and interpreting dual tone multifrequency (DTMF) signals entered by the caller or by recognized speech input by the caller, (iii) organize the collected information in a specific format and (iv) forward the collected information to be utilized within on hold system 42. For purposes of the present invention, prompts to the caller may be in voice, text, video, and/or graphical formats depending on the interface receiving the prompt. In addition, a voice browser may be utilized to output voice XML pages to a caller and monitor responses from the caller.

Particularly, in the present invention, IVRU 41 preferably follows a transaction script to prompt the caller to select from among multiple available token advancement systems, collects the selection information from the caller, organizes the selection information into a format useable by on hold system 42 and forwards the selection information within on hold system 42. Then, in response to a caller selection from among the options, the call may be transferred to one of token advancement systems 60. In particular, token advancement systems 60 may be associated with a single on hold system or may be accessible by multiple on hold systems from multiple call centers 16a-16n. In cases where token advancement systems 60 are accessible by multiple call centers, services provided to callers may be distinguished according to vendor. Further, while in the present embodiment token advancement systems 60 are illustrated as connected via network 20 to on hold system 42, in alternate embodiments, token advancement systems 60 may be located within on hold system 42.

In the example, token advancement systems 60 include a competition system 62, a survey system 64, a promotion system 66, and a chat room system 68. Advantageously, a caller may participate through competition system 16 in multiple available games against other callers waiting in the call queue to receive advancement tokens for winning. Alternatively, a caller may participate through survey system 18 in a survey to receive advancement tokens. Further, a caller may access a promotional account with a particular vendor through promotion system 20, wherein credits within the promotional account may be transferred into advancement tokens. In the present invention, losers of a competition may receive a consolation prize in the form of an advancement token, membership points, or other redeemable item by competition system 62.

In addition, in the present invention, promotion system 66 may grant additional advancement tokens to callers according to additional criteria. For example, a call center may grant additional advancement tokens to a caller whose profile indicates a particular type of account. In another example, a call center may multiple advancement tokens given to experts with a success rate exceeding a particular range. Further, promotion system 66 may grant additional advancement tokens to callers utilizing wireless telephony devices or other special telephony devices. In particular, promotion system 66 may grant advancement tokens that are automatically redeemed during a call hold.

Moreover, a first caller may participate in a chat room system 68 with at least one other caller, where the first caller is awarded advancement tokens by answering questions of at least one other caller to the satisfaction of the at least one other caller to finish the call prior to speaking with a representative. It is advantageous to allow callers to waiting in on hold system 42 to answer questions for one another, such that some callers are able to finish the call without needing to speak with a representative.

In particular, a caller may pose a question and participate in other activities until another caller listens to the question and is willing to try to answer the question. At that point, both callers are preferably transferred to a chat room system to interact, where the chat room system monitors the call. Other callers may join a chat room already in session.

If a caller decides to end a call because the caller's question has been answered in a chat room, that caller preferably provides a rating of the answer according to the VID of the caller answering the question. The chat room system may then award an advancement token to the caller answering the question.

In particular, in the present invention, the chat room preferably accesses the caller profile of all callers present according to VIDs, where caller profiles indicate the average times that each caller speaks with a representative per call. If a first caller waiting in the hold queue is able to answer the questions of a second caller with a particularly long average representative use time, such that the second caller is satisfied and does not wait to speak with a representative, additional value may be added to an advancement token for that caller.

According to an advantage of requiring caller identity authentication, the VIDs of callers participating in a chat room may be transferred between callers. Along with the authenticated identification, an expertise of each caller may be included within a caller profile that is transferred between callers. Callers may also rate other callers, where ratings are stored according to VID in caller profiles that are accessible during future calls.

Advancement tokens are preferably a record of the type of token advancement system utilized, the type of action performed by the caller, and any resulting change in position promised by the token advancement system. In addition, other information may be included in an advancement token.

According to a further advantage of the present invention, advancement tokens are preferably authenticated by the VID of the token advancement system providing the advancement token. For example, where the on hold system receives an advancement token, the on hold system may require authentication of the token advancement system before the advancement token will be honored. Authentication of the identity of a token advancement system may be performed utilizing passwords, voice authentication, or other security devices.

Advancement tokens are preferably transferred from any of token advancement systems 60 to on hold system 42 in association with a caller VID, but independent of whether the call is transferred back to on hold system 42. Alternatively, advancement tokens may be transferred to caller profile server 50 to be stored in association with a particular caller VID.

Upon receipt of a caller profile containing a redeemable advancement token or upon receipt of an advancement token just earned, on hold system 42 preferably offers the caller the option of whether to redeem the advancement token. If a caller selects to redeem an advancement token, then on hold system 42 calculates an adjustment of the position of a call within a queue according to the advancement token. In particular, on hold system 42 may include a rating system for advancement tokens for calculating the adjustment in call position. Alternatively, each of token advancement systems 60 may include a rating system for advancement tokens that calculates the adjustment in position of a call for a vendor. Further, the actual adjustment in position may entail advancing a particular number of positions within the queue or may entail advancing a particular amount of estimated waiting time within the queue.

In some cases, the total value of an advancement token in not needed to advance a caller to the front of a hold queue. In those cases, the remainder of the value of the advancement token not utilized may be discarded or may be stored according to VID for a future call. On hold system 42 preferably updates the caller profile with the remainder of the advancement token according to VID at caller profile server 50 or in a local caller profile database.

If a caller does not select to redeem an advancement token, then the on hold system 42 preferably transfers the redeemable advancement token to caller profile server 50 or a local caller profile database according to the caller VID. Advantageously, by storing advancement tokens for access by a single identifier, a VID, a caller may redeem the advancement tokens at multiple diverse call centers. In addition, by storing advancement tokens for access by a single identifier, a VID, a call center may automatically retrieve the advancement tokens, secure in the identity of the caller, without requiring the caller to remember additional identifiers or passwords.

On hold system 42 preferably sends a return request to the token advancement system holding a call either when the call is the next to be answered in the call queue or when the PBX is able to transfer the call to the next representative. The caller is given the option of completing any activities in progress before transfer to a representative. In practice, an IVRU preferably plays a short message to the caller indicating that the call is next in line to be answered.

Figure 3:
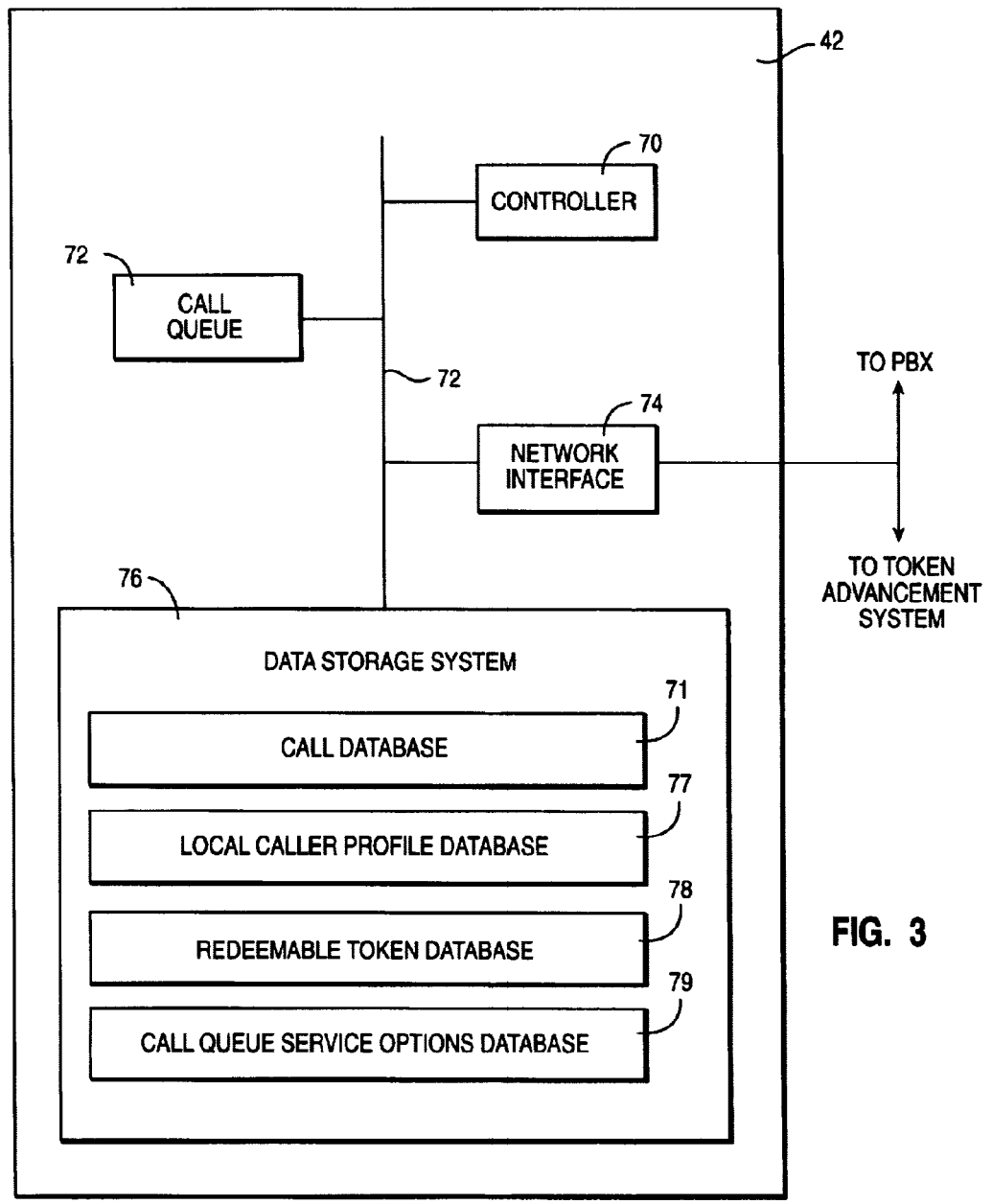
FIG. 3 depicts a block diagram of an on hold system in accordance with the method, system, and program of the present invention.

Referring now to FIG. 3, there is illustrated a block diagram of an on hold system in accordance with the method, system, and program of the present invention. As illustrated, on hold system 42 includes a controller 70, a call queue 72, a network interface 74, and a data storage system 76 communicatively connected via a bus 76. Additional systems may be connected along bus 76 that are not depicted herein. Controller 70 preferably includes, but is not limited to, at least one processor, memory, a data storage system, system software, and application software, that function together to perform the functions described with reference to controller 70.

Network interface 74 preferably communicates with PBX 40 and token advancement systems 60 via a telephone network or other networking system. In particular, network interface 74 receives transfers of calls from PBX 40 and then returns calls to PBX 40 when a call is the next in line within call queue 72. In addition, in particular, network interface 74 transfers calls to token advancement systems 60 and then receives advancement tokens associated with caller VIDs. Further, network interface 74 transfers indicators to token advancement systems 60 that a call is next in line and receives the call back from token advancement systems 60.

Controller 30 preferably detects a new call, stores the call in call queue 32 and initiates IVRU 41 to control output of the menu of options included in call queue service options database 79 to the caller. A caller may select from multiple service options including, but not limited to, music and information services, third-party calling services, Internet browsing services, and position adjustment services, herein described as token advancement services.

TABLE 1

| Code | Service |
|---|---|
| #00 | Music/News |
| #01 | Third-party calling |
| #02 | Internet browsing |
| #03 | Position adjustment |

Table 1 above illustrates textual prompts for the automated output of exemplary codes that may be entered by the caller and the corresponding services that may be accessed. For example, #02 may direct controller 30 to connect the caller terminal to a music channel. In another example, #03 may initiate audio automated output of an additional set of selections of the types of position adjustment services available. In addition to entry of codes, a user may provide a voice entry that selects from one of the services where the IVRU of controller 30 utilizes a voice recognition system to match the voice entry with one of the services.

Depending on the service selection selected by each caller, the call is transferred to one of multiple service provision systems. In particular, controller 30 will place the call on hold in order to transfer the call via network interface to a service provision system. As previously described, according to a preferred embodiment of the present invention, a caller may select a token advancement service, where the call is the transferred to the selected one of multiple available token advancement systems.

TABLE 2

| VID | Call Tracking No. | Q Position | Current System |
|---|---|---|---|
| 512-00-1111 | 1010 | 7 | Chat room |
| 512-00-2222 | 1012 | 4 | Chat room |

Table 2 depicts an example of a portion of a call database 71 within data storage system 76. Advantageously, upon receipt of a new call, controller 70 adds an entry to call database 71 indicating the VID, tracking number, and current call queue position of the call. As a call changes in position within the call queue, the position is also updated within call database 71. In addition, the current system processing a call is preferably recorded. For example, the chat room is currently processing the two calls recorded. The chat room may be accessed via the Internet or via a local network. Further, additional categories of data may be included within call database 71 such as the time the time each call is received, the total time waiting, the identity of the caller, and other information which enables ACD 12 to better handle manage each call.

TABLE 3

| VID | TA System | Action | Promised | Result |
|---|---|---|---|---|
| 512-00-1111 | Chat Room | Answered Q | 3 pos | caller 512-00-2222 hung up |

Table 3 illustrates an example of a portion of a redeemable token database 78 within data storage system 76. Advantageously, callers may earn advancement tokens from token advancement systems 60. In addition, callers may transfer advancement tokens between themselves.

The advancement tokens for a caller may be received at on hold system 42 while the call continues to be processed by token advancement systems 60. Controller 70 adds an entry to redeemed token database 79 indicating the VID, type of token advancement system from which the token is earned, the action taken by the caller, and the promised result by the token advancement system 14.

In addition, entries may be added to redeemable token database 78 according to a caller VID, where the advancement tokens are retrieved from a caller profile for the caller VID. The entries received from a caller profile may be separated from currently earned advancement tokens.

Preferably a caller is provided with the option of redeeming a redeemable advancement token from redeemable token database 78 during the current hold session or storing any redeemable advancement tokens for a future hold session. For example, where a caller's wait time is minimal, it may not be advantageous for a caller to redeem an advancement token. However, where a caller's wait time is extended and it is not in the caller's interest to wait, the caller may redeem advancement tokens to shorten the expected wait time.

When a caller finishes a call the call center, any redeemable advancement tokens that have not yet been redeemed are preferably transferred to a caller profile according to the caller VID. In particular, an expiration date and the authenticated identity of the token advancement system authorizing an advancement token are preferably attached to any unredeemed advancement tokens earned during that call.

The example of a redeemable advancement token illustrated in Table 3 depicts an advancement token authorized in response to a first caller answering the questions of second caller in a chat room scenario while the two callers were on hold. The second caller ended the call prior to reaching a representative because the first caller was able to sufficiently aid the second caller. The second caller preferably rates the first caller prior to hanging up, such that the first caller receives advancement tokens for providing support. Advancement tokens may be transferred from an advancement token system 60 or from the second caller. In particular, the chat room system may monitor calls in order to verify the types of questions asked and answered.

In particular, in the technical support area, callers of multiple expertise may be waiting in a hold queue at the same time, where a caller of greater expertise may be able to answer the question of a caller with a question within the expertise of the previous caller. Technical support lines often receive the bulk of questions and training representatives is expensive; reducing the number of callers needing to speak to a representative but still receiving the information that could have been provided by a representative is advantageous.

Controller 70 preferably monitors the position of a caller VID within call queue 72 after the call has been transferred to one of token advancement systems 60 or other services available to callers on hold. When a call is the next to be answered, controller 60 generates an indicator signal for transfer to the service system currently processing the call and network interface 74 transfers the signal to the service system. Calls may be delayed in return to on hold system 42 if the caller wishes to continue participation in a particular service. In that case, controller 60 would delay that call within the queue and move to the next call to be answered.

According to another advantage of the present invention, in addition to monitoring the position of a call tracking number within call queue 72, controller 70 may perform analysis on the current flow of calls, the number of available representatives, the historical flow of calls, and other statistical data to estimate the wait time remaining for each call in the call queue 72. Queue data include, but not limited to, the number of people currently on hold, average time each caller is on hold, average time per call once connected with an attendant, the caller's position in the queue, and the caller's estimated hold time may be published to the caller. In particular, the queue data may be presented to the caller in an audio format over the phone or in a video format to a video phone, in which the caller would enter their requests via a keypad or through speech recognition. Alternatively, the queue data may be presented to the caller on a Web page that the caller can access with the caller's VID.

In the present invention, allowing callers to view estimated wait times and the position of other callers is particularly advantageous for the caller in selecting token advancement services and in monitoring actual progress in call queue 72 according to redemption of advancement tokens. In particular, where a caller chooses to redeem membership points for an advancement in position, it is advantageous for a caller to have an estimate of the number of positions needed to reach the top of call queue 72 or the estimated wait time until reaching the top of call queue 72.

Referring now to FIG. 4, there is depicted an illustrative representation of a caller profile according to a caller VID in accordance with the method, system, and program of the present invention. As depicted, caller profile 75 illustrates caller profile information for a particular VID. In alternate embodiments, alternate types of information may be included in caller profile 75.

Advantageous to the present invention, membership points are managed in a caller profile according to VID and further distinguished according to the company or vendor providing the membership points. A caller may redeem membership points for advancement tokens, in order to advance in position within a hold queue. Generic membership points that are redeemable across multiple vendors or companies may also be included.

In addition, advantageous to the present invention, advancement tokens are managed in a caller profile according to the call center or vendor providing the advancement tokens. The value of each advancement token is preferably illustrated according to places or minutes. In addition, the authenticated identity of the token advancement (TA) system authorizing the advancement token is stored.

Advancement tokens may be redeemed for queue position adjustment at on hold systems accessing the caller profile. In addition, some vendors may allow a caller to redeem advancement tokens for other values, such as membership points, coupons, or other financial incentives.

Figure 5:
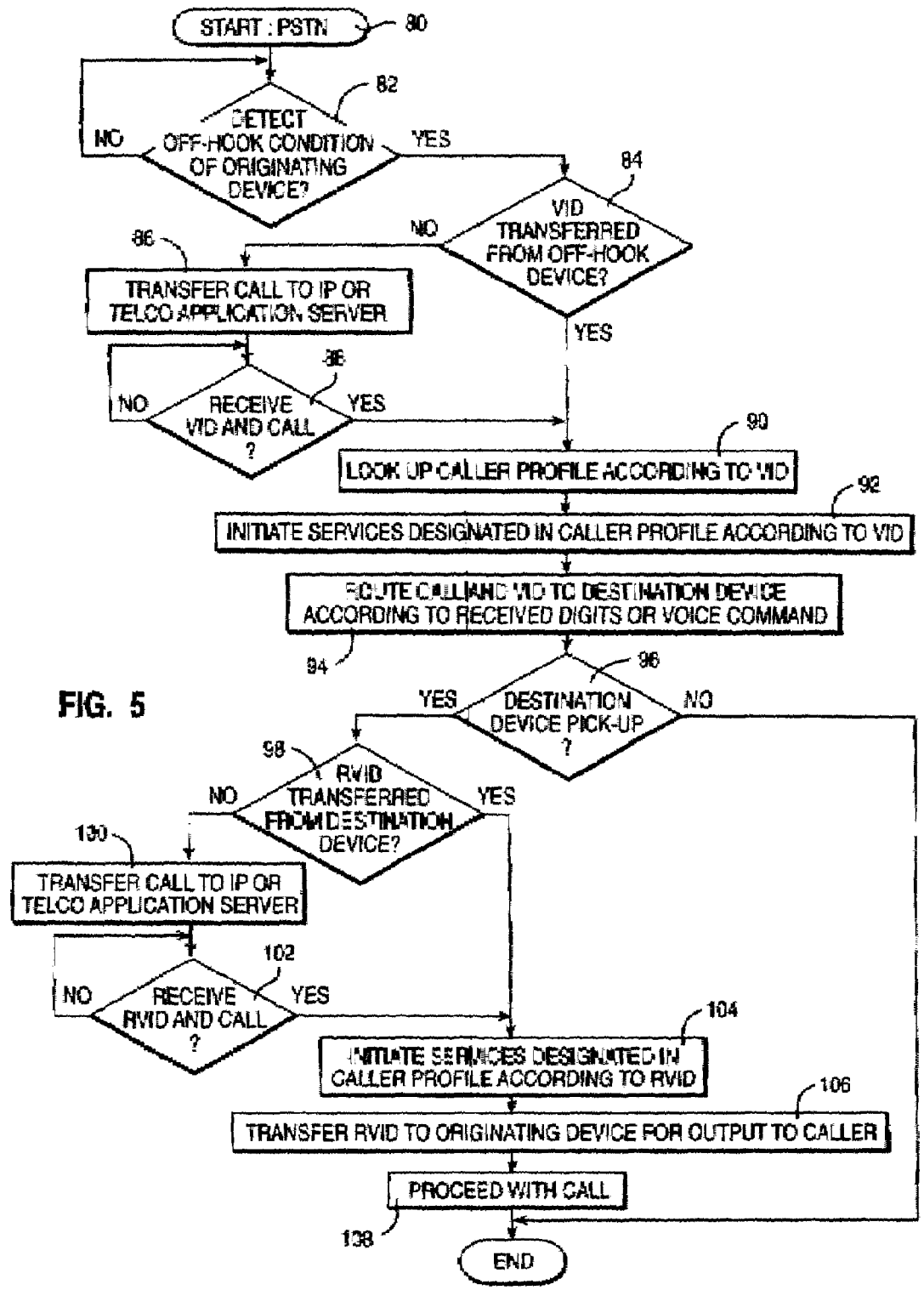
FIG. 5 depicts a high level logic flowchart of a process and program for controlling a switching network in accordance with the method, system, and program of the present invention

With reference now to FIG. 5, there is depicted a high level logic flowchart of a process and program for controlling a switching network in accordance with the method, system, and program of the present invention. As illustrated, the process starts at block 80 and thereafter proceeds to block 82.

Block 82 illustrates a determination as to whether an off-hook condition is detected in association with an originating telephony device. If an off-hook condition is not detected, then the process iterates at block 82. If an off-hook condition is detected, then the process passes to block 84.

Block 84 depicts a determination as to whether a VID is transferred from the off-hook device. The originating telephony device may authenticate an identity for a caller. However, the PSTN or other servers connected thereto may require additional authentication within a trusted network for access to certain types of services. If a VID is received and no additional authentication is required, then the process passes to block 90. If a VID is not received or if the PSTN requires additional authentication, then the process passes to block 86. Block 86 illustrates transferring the call to an intelligent peripheral or a telco application server for authentication. Block 88 depicts a determination as to whether the VID and the call are returned to the switching center. If not, then the process iterates at block 88. If the VID and the call are returned, then the process passes to block 90.

Block 90 depicts looking up the caller profile according to VID. The caller profile may be stored in a database within the PSTN, in an extended network to the PSTN or in a network external to the PSTN. Next, block 92 illustrates initiating services designated in the caller profile retrieved according to the VID. Thereafter, block 94 depicts routing the call and the VID to a destination device according to received digits or a voice command, and the process passes to block 96.

Block 96 illustrates a determination as to whether the destination device is detected with a pick-up (off-hook) condition. If the destination device does not pick-up, then the process ends. If the destination device does pick-up, then the process passes to block 98.

Block 98 depicts a determination as to whether an RVID is transferred from the destination device. If the RVID is transferred, then the process passes to block 104. If not, then the process passes to block 100. Block 100 illustrates transferring the call to an intelligent peripheral or telco application server. Next, block 102 depicts a determination as to whether an RVID and call are received back at the switching center. If not, then the process iterates at block 102. When the RVID and call are received, then the process passes to block 104.

Block 104 illustrates initiating services designation in a caller profile associated with the RVID. Next, block 106 depicts transferring the RVID to the originating device for output to the caller. Thereafter, block 108 illustrates proceeding with the call, where additional services are applied when applicable, and the process ends.

Figure 6:
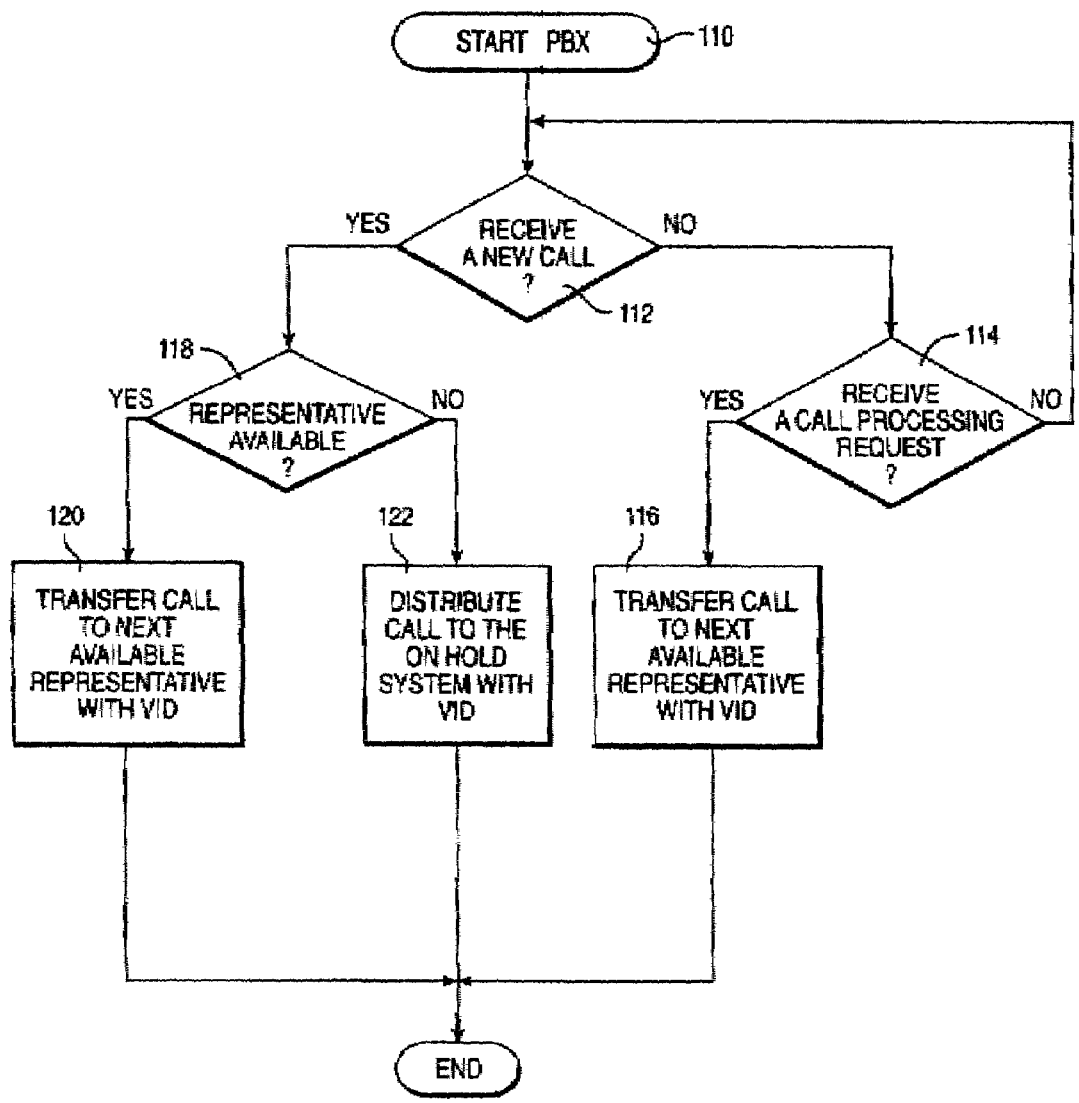
FIG. 6 illustrates a high level logic flowchart of a process and program for controlling a PBX system in accordance with the method, system, and program of the present invention.

With reference now to FIG. 6, there is depicted a high level logic flowchart of a process and program for controlling a PBX system within a call center in accordance with the method, system, and program of the present invention. As illustrated, the process starts at block 110 and thereafter proceeds to block 112.

Block 112 depicts a determination as to whether a new call is received. If a new call is received, then the process passes to block 118. If a new call is not received, then the process passes to block 114. Block 114 illustrates a determination as to whether or not a call processing request is received. When a call is at the top of the call queue, the call is preferably transferred back to the PBX with a call processing request. If a call processing request is not received, then the process passes to block 112. If a call process request is received, then the call is transferred to the next available representative with a VID, as depicted at block 116, and the process ends.

Block 118 illustrates a determination as to whether or not a representative is available. If a representative is available, then the call is transferred to the next available representative with a VID, as illustrated at block 120, and the process ends. If a representative is not available, then the process passes to block 122. Block 122 illustrates distributing the call to the on hold system with the VID, and the process ends.

Figure 7:
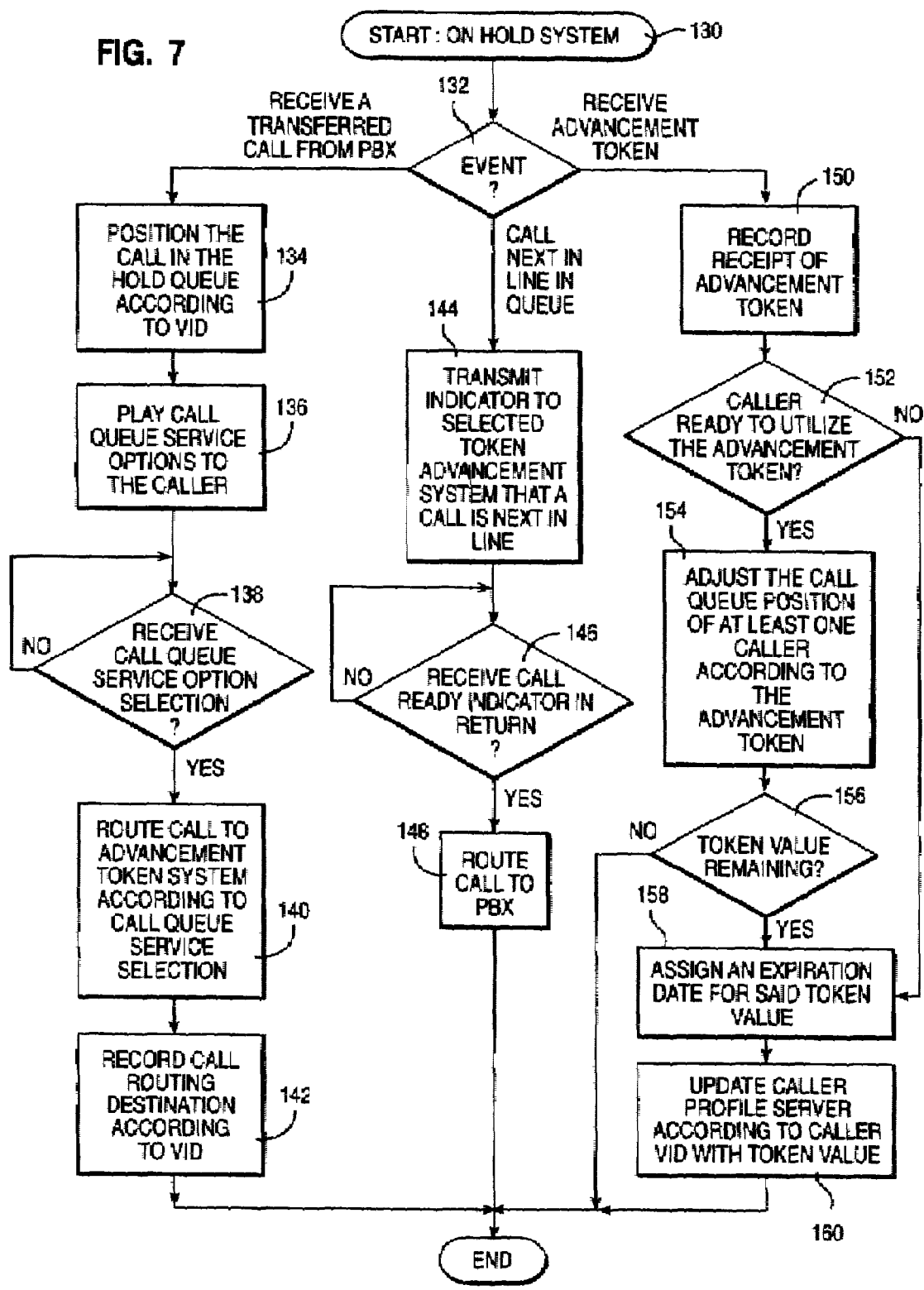
FIG. 7 depicts a high level logic flowchart of a process and program for controlling an on hold system in accordance with the method, system, and program of the present invention.

Referring now to FIG. 7, there is depicted a high level logic flowchart of a process and program for controlling an on hold system in accordance with the method, system, and program of the present invention. As illustrated, the process starts at block 130 and thereafter proceeds to block 132.

Block 132 illustrates a determination as to the event that has occurred. If the event is receipt of a transferred call from the PBX, then the process passes to block 134. If the event is that a call is positioned at the front of a queue and thus next in line to be answered, then the process passes to block 144. If the event is that an advancement token is received, then the process passes to block 150.

Block 134 depicts positioning the call in the hold queue according to the caller VID. Next, block 136 illustrates playing call queue service options to the caller. Thereafter, block 138 depicts a determination as to whether or not a call queue option selection is received. The process iterates at block 138 until a selection is received or after a particular time period a default is selected, and the process proceeds to block 140.

Block 140 illustrates routing the call to a token advancement system according to the call queue service selection. Next, block 142 depicts recording the call routing destination according to VID, and the process ends.

Block 144 illustrates transmitting an indicator signal to the token advancement system holding the call that the next available representative will receive the call. Next, block 146 depicts a determination as to whether the caller has indicated a readiness for the call to be returned. If the caller has not indicated a readiness to return, then the process iterates at block 146. If the caller has indicated a readiness to return, then the process passes to block 148. Block 148 illustrates receiving the call from the token advancement system, routing the call to the PBX, and dropping the call from the call queue. Thereafter, and the process ends.

Block 150 depicts recording the receipt of an advancement token. In particular, an advancement token may be received from a token advancement system or from a caller profile. In addition, in particular, the on hold system may require authentication of the identity of the system providing an advancement token before providing a caller the option of redeeming the advancement token. Next, block 152 illustrates a determination as to whether the caller is ready to utilize the advancement token. If a caller is ready to utilize the advancement token, then the process passes to block 154. If a caller is not ready to utilize the advancement token, then the process passes to block 158.

Block 154 illustrates adjusting the call queue position of at least one caller according to the advancement token. In particular, where one caller is advanced in position, another caller may be declined in position. Next, block 156 depicts a determination as to whether a token value is remaining after the application of the advancement token. If there is a remainder of the advancement token unused, then the process passes to block 158. If there is not a remainder, then the caller profile for the VID is preferably updated according to the advancement token use, and the process ends.

Block 158 depicts assigning an expiration date for said token value. Next, block 160 illustrates updating a caller profile server according to the caller VID with the advancement token, and the process ends.

Figure 8:
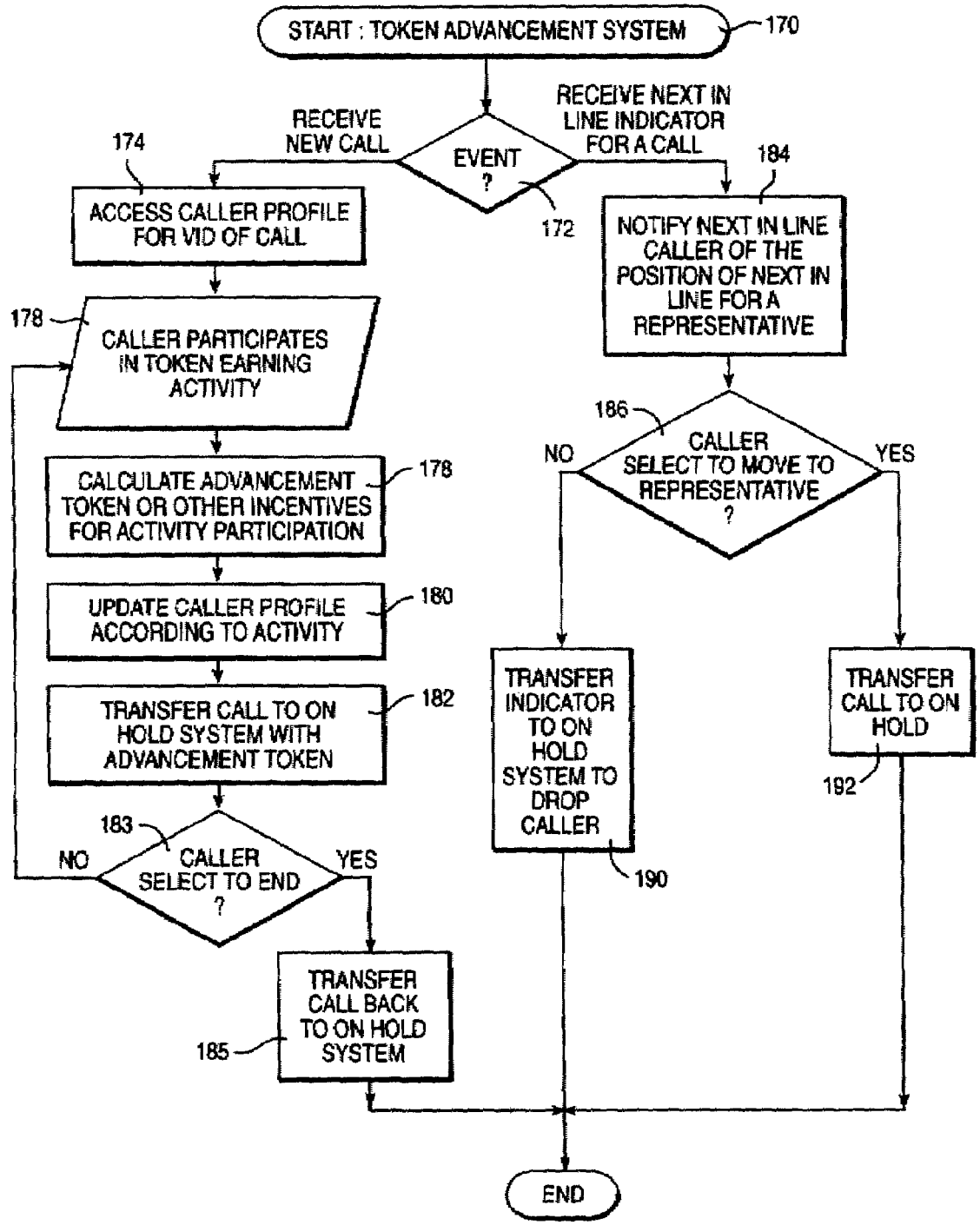
FIG. 8 illustrates a high level logic flowchart of a process and program for controlling a token advancement system in accordance with the method, system, and program of the present invention.

With reference now to FIG. 8, there is illustrated a high level logic flowchart of a process and program for controlling a token advancement system in accordance with the method, system, and program of the present invention. As depicted, the process starts at block 170 and thereafter proceeds to block 172.

Block 172 illustrates a determination as to what event occurred when an event occurs. If a new call is received, then the process passes to block 174. If an indicator that a call is next in line is received, then the process passes to block 184. Block 174 depicts accessing a caller profile for the caller VID. Next, block 176 illustration callers participating in token earning activity.

In particular, a caller profile may be utilized to specify competition preferences. In addition, a caller may utilize membership points or previously earned advancement tokens as competition points utilized in making wagers or playing other games.

A caller profile may also be utilized to specify the type of survey given to a caller. For example, surveys may be tailored according to the age of callers, products owned by callers, and other information included in a caller profile.

In addition, a caller profile may include membership points which are redeemable by the caller for advancement tokens. Advantageously, a caller may indicate a desire number of positions or time to move and the promotional system will interface with the on hold system to determine the amount of points needed for the adjustment in position.

Further, a caller profile may include membership points or advancement tokens which may be transferred from the caller profile to another caller. For example, where callers compete against one another, the callers may wager membership points that go to the winner of the competition.

Block 178 depicts calculating an advancement token or other incentives for activity participation. Next, block 180 illustrates updating a caller profile according to the activity. Thereafter, block 182 depicts transferring the advancement token to the on hold system. Next, block 183 illustrates a determination as to whether the caller wants to end participation at the token advancement system. If the caller does not want to end participation, then the process passes to block 176. If the caller does want to end participation, then the call is transferred back to the on hold system, as depicted at block 185, and the process ends.

Block 184 illustrates notifying the next in line caller of the position. Next, block 186 depicts a determination as to whether the caller is ready to transfer to a representative. If the caller is ready, then the call is transferred to the on hold system, as illustrated at block 192, and the process ends. If the caller is not ready, then the process passes to block 188. Block 188 depicts transferring an indicator to the on hold system to drop the caller from the hold queue, and the process ends.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

While the invention has been particularly shown and described with reference to a preferred embodiment, it will be understood by those skilled in the art that various changes in form and detail may be made therein without departing from the spirit and scope of the invention.

What is claimed is:

1. A method for caller position management within a hold queue comprising:

detecting an advancement token earned by a caller waiting in a hold queue; and storing said advancement token for redemption in a future call by said caller according to an authenticated identifier for said caller, wherein said authenticated identifier for said caller is authenticated according to a voice identity of said caller, wherein future redemption of said advancement token will cause adjustment of a waiting position.

2. The method for caller position management within a hold queue according to claim 1, further comprising:

accessing a caller profile according to said authenticated identifier, wherein said caller profile comprises a previously earned advancement token; and offering said caller an option of redeeming said previously earned advancement token to adjust a position of said caller within said hold queue.

3. The method for caller position management within a hold queue according to claim 1, wherein storing said advancement token further comprises:

storing said advancement token according to said authenticated identifier at a caller profile server accessible to a plurality of a call centers, wherein said advancement token is redeemable across a selection of said plurality of call centers for said future call.

4. The method for caller position management within a hold queue according to claim 1, wherein storing said advancement token further comprises:

storing said advancement token according to said authenticated identifier at a caller profile server accessible to said hold queue, wherein said advancement token is only redeemable at said hold queue for said future call.

5. The method for caller position management within a hold queue according to claim 1, further comprising:

redeeming a portion of said advancement token for adjusting a position of said caller within said hold queue; and storing a remainder of said advancement token for said future call.

6. The method for caller position management within a hold queue according to claim 1, wherein an expiration date is assigned to said advancement token.

7. The method for caller position management within a hold queue according to claim 1, wherein said detecting an advancement token further comprises:

detecting said advancement token earned by a caller by participating in at least one from among a competition, a survey, and a redemption of membership points.

8. The method for caller position management within a hold queue according to claim 1, wherein redemption of said advancement token advances said caller a particular number of waiting positions.

9. The method for caller position management within a hold queue according to claim 1, wherein redemption of said advancement token advances said caller a particular amount of estimated wait time.

10. A system for caller position management within a hold queue comprising:
   a call center comprising a hold queue;
   means for detecting an advancement token earned by a caller waiting in said hold queue; and
   means for storing said advancement token for redemption in a future call by said caller according to an authenticated identifier for said caller, wherein said authenticated identifier for said caller is authenticated according to a voice identity of said caller, wherein future redemption of said advancement token will cause adjustment of a waiting position.

11. The system for caller position management within a hold queue according to claim 10, further comprising:
   means for accessing a caller profile according to said authenticated identifier, wherein said caller profile comprises a previously earned advancement token; and
   means for offering said caller an option of redeeming said previously earned advancement token to adjust a position of said caller within said hold queue.

12. The system for caller position management within a hold queue according to claim 10, wherein said means for storing said advancement token further comprises:
   means for storing said advancement token according to said authenticated identifier at a caller profile server accessible to a plurality of a call centers, wherein said advancement token is redeemable across a selection of said plurality of call centers for said future call.

13. The system for caller position management within a hold queue according to claim 10, wherein said means for storing said advancement token further comprises:
   means for storing said advancement token according to said authenticated identifier at a caller profile server accessible to said hold queue, wherein said advancement token is only redeemable at said hold queue for said future call.

14. The system for caller position management within a hold queue according to claim 10, further comprising:
   means for redeeming a portion of said advancement token for adjusting a position of said caller within said hold queue; and
   means for storing a remainder of said advancement token for said future call.

15. The system for caller position management within a hold queue according to claim 10, wherein an expiration date is assigned to said advancement token.

16. The system for caller position management within a hold queue according to claim 10, wherein said means for detecting an advancement token further comprises:
   means for detecting said advancement token earned by a caller by participating in at least one from among a competition, a survey, and a redemption of membership points.

17. The system for caller position management within a hold queue according to claim 10, wherein redemption of said advancement token advances said caller a particular number of waiting positions.

18. The system for caller position management within a hold queue according to claim 10, wherein redemption of said advancement token advances said caller a particular amount of estimated wait time.

19. A computer program product for caller position management within a hold queue, said computer program product embodied in a recordable-type computer-readable medium, comprising:
   means, recorded on said computer-readable medium, for detecting an advancement token earned by a caller waiting in a hold queue;
   means, recorded on said computer-readable medium, for authenticating an identifier for said caller according to a voice identity of said caller; and
   means, recorded on said computer-readable medium, for storing said advancement token for redemption in a future call by said caller according to said authenticated identifier for said caller, wherein future redemption of said advancement token will cause adjustment of a waiting position.

20. The computer program product for caller position management within a hold queue according to claim 19, further comprising:
   means, recorded on said computer-readable medium, for accessing a caller profile according to said authenticated identifier, wherein said caller profile comprises a previously earned advancement token; and
   means, recorded on said computer-readable medium, means for offering said caller an option of redeeming said previously earned advancement token to adjust a position of said caller within said hold queue.

21. The computer program product for caller position management within a hold queue according to claim 19, further comprising:
   means, recorded on said computer-readable medium, for storing said advancement token according to said authenticated identifier at a caller profile server accessible to a plurality of a call centers, wherein said advancement token is redeemable across a selection of said plurality of call centers for said future call.

22. The computer program product for caller position management within a hold queue according to claim 19, further comprising:
   means, recorded on said computer-readable medium, for storing said advancement token according to said authenticated identifier at a caller profile server accessible to said hold queue, wherein said advancement token is only redeemable at said hold queue for said future call.

23. The computer program product for caller position management within a hold queue according to claim 19, further comprising:
   means, recorded on said computer-readable medium, for redeeming a portion of said advancement token for adjusting a position of said caller within said hold queue; and
   means, recorded on said computer-readable medium, for storing a remainder of said advancement token for said future call.

24. The computer program product for caller position management within a hold queue according to claim 19, further comprising:
   means, recorded on said recording medium, for detecting said advancement token earned by a caller by participating in at least one from among a competition, a survey, and a redemption of membership points.

* * * * *